(12) United States Patent
Parada San Martin et al.

(10) Patent No.: US 9,202,462 B2
(45) Date of Patent: Dec. 1, 2015

(54) KEY PHRASE DETECTION

(71) Applicant: Google Inc., Mountain View, CA (US)

(72) Inventors: Maria Carolina Parada San Martin, Palo Alto, CA (US); Alexander H. Gruenstein, Sunnyvale, CA (US); Guoguo Chen, Baltimore, MD (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 14/041,131

(22) Filed: Sep. 30, 2013

(65) Prior Publication Data

US 2015/0095027 A1     Apr. 2, 2015

(51) Int. Cl.
| | |
|---|---|
| *G10L 15/00* | (2013.01) |
| *G10L 15/06* | (2013.01) |
| *G10L 15/02* | (2006.01) |
| *G10L 17/18* | (2013.01) |
| *G10L 15/10* | (2006.01) |
| *G10L 15/14* | (2006.01) |
| *G10L 15/16* | (2006.01) |
| *G06N 3/04* | (2006.01) |
| *G06N 7/00* | (2006.01) |
| *G10L 15/04* | (2013.01) |
| *G10L 15/08* | (2006.01) |

(52) U.S. Cl.
CPC ............ *G10L 15/063* (2013.01); *G06N 3/0454* (2013.01); *G06N 7/005* (2013.01); *G10L 15/02* (2013.01); *G10L 15/08* (2013.01); *G10L 15/10* (2013.01); *G10L 15/14* (2013.01); *G10L 15/16* (2013.01); *G10L 17/18* (2013.01); *G10L 2015/0631* (2013.01); *G10L 2015/088* (2013.01)

(58) Field of Classification Search
CPC ....... G10L 15/063; G10L 15/22; G10L 15/30; G10L 15/227; G10L 2015/228; G10L 15/02; G10L 17/18; G10L 15/08; G10L 15/10; G10L 15/14; G10L 15/16; G10L 15/265; G10L 15/20; G10L 2015/0631; G10L 2015/088; G06N 3/0454; G06N 7/005
USPC ................................... 704/200, 231, 232, 251
See application file for complete search history.

(56) References Cited

U.S. PATENT DOCUMENTS

2012/0245934 A1*  9/2012  Talwar et al. ................. 704/235

OTHER PUBLICATIONS

"Sensory, Inc.—Embedded Speech Technologies for Consumer Electronics," downloaded from the internet on Sep. 12, 2013, http://www.sensoryinc.com/, 1 page.
"Speech Recognition," Speech Recognition | Neuro AI, downloaded from the internet on Sep. 16, 2003, http://www.learnartificialneuralnetworks.com/speechrecognition.html, 9 pages.

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on computer storage media, for key phrase detection. One of the methods includes receiving a plurality of audio frame vectors that each model an audio waveform during a different period of time, generating an output feature vector for each of the audio frame vectors, wherein each output feature vector includes a set of scores that characterize an acoustic match between the corresponding audio frame vector and a set of expected event vectors, each of the expected event vectors corresponding to one of the scores and defining acoustic properties of at least a portion of a keyword, and providing each of the output feature vectors to a posterior handling module.

27 Claims, 6 Drawing Sheets

(56) References Cited

OTHER PUBLICATIONS

"Spoken Keyword Spotting Benchmark," Keyword Spotting, downloaded from the internet on Sep. 12, 2013, http://ttic.uchicago.edu/~jkeshet/Keyword_Spotting.html, 2 pages.
Akbacak, Murat et al., "Rich System Combination for Keyword Spotting in Noisy and Acoustically Herterogeneous Audion Streams," In Proceedings IEEE ICASSP (Vancouver, BC), May 2013, 5 pages.
Benayed, Y. et al., "Confidence Measures for Keyword Spotting Using SVMs," ICASSP 2003, 4 pages.
Bridle, J.S., "An Efficient Elastic-Template Method for Detecting Give Words in Running Speech," In Proceedings of the British Acoustic Society Meeting, 1973, 5 pages.
Dahl, G.E. et al., "A Context-Dependent Pre-Trained Deep Neural Networks for Large-Vocabulary Speech Recognition," IEEE Transactions on Audio, Speech, and Language Processing, vol. 20, No. 1, Jan. 2013, 13 pages.
Fernandez, Santiago et al., "An Application of Recurrent Neural Networks to Discriminative Keyword Spotting," ICANN 2007, 10 pages.
Grangier, D. et al, "Discriminative Keyword Spotting," Speech Communication 2009, 23 pages.
Higgins, Alan L. et al., "Keyword Recognition using Template Concatenation," IEEE 1985, 4 pages.
Hinton, G. et al., "Deep Neural Networks for Acoustic Modeling in Speech Recognition: The Shared Views of Four Research Groups," Signal Processing Magazine, IEEE, vol. 29, No. 6, Nov. 2012, 16 pages.
Keshet, Joseph et al., "Discriminative Keyword Spotting," Speech Communication, vol. 51, No. 4, Apr. 2009, 27 pages.
Ling, Yong, "Keyword Spitting in Continuous Speech Utterances," School of Computer Science, McGill University, Montreal, A Thesis submitted to the Faculty of Graduate Studies and Research in partial fulfillment of the requirements for the degree of Master of Science, Feb. 1, 1999, 80 pages.
Rose, R.C. et al., "A Hidden Markov Model Based Keyword Recognition System," ICASSO 1990, 4 pages.
Sandness, E.D. et al., "Keyword-Based Discriminative Training of Acoustic Models," ICSLP 2000, 4 pages.
Sukkart, Rafid A. et al., "Utterance Verification of Keyword Strings Using Word-Based Minimum Verification Error (WB-MVE) Training," 1996 IEEE, 4 pages.
Szöke, Igor et al., "Comparison of Keyword Spotting Approaches for Informal Continuous Speech," Interspeech 2005, 4 pages.
Tatibian et al., "Performance Evaluation for an HMM-Based Keyword Spotter and a Large-Margin Based One in Noisy Environments," WCIT 2010, 5 pages.
Tebelskis, Joe, "Speech Recognition Using Neural Networks," School of Computer Science, Carnegie Mellon University, Submitted in partial fulfillment of the requirements for a degree of Doctor of Philosophy in Computer Science, 1995, 190 pages.
Thambiratnam, K. et al., "Fusion of Cohort-Word and Speech Background Model Based Confidence Scores for Improved Keyword Confidence Scoring and Verification," SETIT 2005, 5 pages.
Weintraub, M. et al., "Neural-Network Based Measures of Confidence for Word Recognition," ICASSP 1997, 4 pages.
Weintraub, Mitchel, Improved Keyword-Spotting Using SRI's Decipher™ Large-Vocabularly Speech-Recognition System, 1993, 5 pages.
Weintraub, Mitchel, Keyword-Spotting Using SRI's Decipher™ Large-Vocabulary Speech-Recognition System, ICASSP 1993, 4 pages.
Weintraub, Mitchel, "LVCSR Log—Likelihood Ratio Scoring for Keyword Spotting," ICASSP 1995, 4 pages.
Chen et al., "Small-footprint keyword spotting using deep neural networks," 2014 IEEE International Conference on Acoustics, Speech and Signal Processing (ICASSP), IEEE, May 4, 2014, pp. 4087-4091, [retrieved on Jul. 11, 2014].
International Search Report and Written Opinion in International Application No. PCT/US2014/045592, mailed Nov. 12, 2014, 11 pages.

* cited by examiner

KEY PHRASE DETECTION

FIELD

This specification describes technologies related to voice recognition.

BACKGROUND

Automatic speech recognition is one technology that is used in mobile devices. One task that is a common goal for this technology is to be able to use voice commands to wake up and have basic spoken interactions with the device. For example, it may be desirable to recognize a "hotword" that signals that the mobile device should activate when the mobile device is in a sleep state.

SUMMARY

The methods and systems described herein provide keyword recognition that is fast and low latency, power efficient, flexible, and optionally speaker adaptive. A designer or user can choose the keywords. Embodiments include various systems directed towards robust and efficient keyword detection.

In general, one innovative aspect of the subject matter described in this specification can be embodied in a process that is performed by a data processing apparatus. The process includes receiving a plurality of audio frame vectors that each model an audio waveform during a different period of time, generating an output feature vector for each of the audio frame vectors, wherein each output feature vector includes a set of scores that characterize an acoustic match between the corresponding audio frame vector and a set of expected event vectors, each of the expected event vectors corresponding to one of the scores and defining acoustic properties of at least a portion of a keyword, and providing each of the output feature vectors to a posterior handling module.

Other embodiments include corresponding system, apparatus, and computer programs, configured to perform the actions of the method, encoded on computer storage devices.

These and other embodiments may each optionally include one or more of the following features. For instance, the process may include determining, using the posterior handling module, that a first sub-word unit was present in the audio waveform during an overall period of time modeled by the audio frame vectors by combining corresponding scores from the output feature vectors that, each of the corresponding scores characterizing the acoustic match between the audio frame vector and the same expected event vector from the set of expected event vectors, each of the output feature vectors corresponding to one of the audio frame vectors, the first sub-word unit corresponding to at least a portion of one of the keywords, a corresponding one of the expected event vectors, and a corresponding one of the scores in the output feature vector.

In some implementations, a sum of the set of scores for the output feature vector is one. The combining may comprise determining an average, a geometric mean, a sum, a product, or a maximum score for each of the corresponding scores in the output feature vectors. The process may further comprise determining, using the posterior handling module, that a predetermined phrase was present in the audio waveform during the overall period of time modeled by the audio frame vectors, the phrase comprising the first sub-word unit and a second sub-word unit, the second sub-word unit corresponding to at least a portion of one of the keywords and a corresponding one of the expected event vectors.

In some implementations, the output feature vector is generated using a neural network. The process may further comprise training, prior to generating the output feature vector, the neural network with a set of training audio frame vectors that comprises the expected event vectors. The set of training audio frame vectors may comprises a plurality of general audio frame vectors, each of the general audio frame vectors different from all of the expected event vectors and corresponding to words different from the keywords. The output feature vector may be generated using a Gaussian mixture model. The process may further comprise producing the plurality of audio frame vectors by performing front-end feature extraction on an acoustic signal.

Particular embodiments of the subject matter described in this specification can be implemented so as to realize one or more of the following advantages. Embodiments provide a way to recognize whether or not a keyword was uttered in a way that provides a simple design that can obtain good results while minimizing the need for processing and power resources. In some implementations, a device "wakes up" upon receiving a voice command and performs an action associated with the voice command. In some implementations, an acoustic modeling module allows a developer to specify one or more keywords for which the acoustic modeling module will generate scores. In some implementations, the acoustic modeling module may be specific to a particular user and/or may prevent other users from activating a device.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When using a mobile device, it is desirable to provide a way of turning the device on or performing another action based on the utterance of a keyword. For example, a user saying "Google" may cause a smartphone to activate, or "wake up." However, performing speech recognition requires power to constantly monitor and process the audio received by the mobile device, and hence it is important to provide an approach for recognizing whether or not the keyword has been uttered while minimizing the power consumption needed to "listen" for the keyword.

Embodiments may listen for keywords while minimizing resource usage through a variety of approaches. For example, a variety of acoustic modeling techniques may be used to obtain feature vectors that represent whether or not a keyword or a portion of a keyword were included in audio received at the mobile device. The input features obtained from a front-end feature extraction module are converted into detected acoustic events that are assigned scores that characterize a match with expected acoustic events and the scores are placed in an output feature vector. A posterior handling module uses the output feature vector to determine whether or not a keyword or a key phrase was included in the received audio.

While some implementations discussed elsewhere in this specification discuss an implementation that detects a single keyword, implementations are not necessarily limited to detecting one keyword. Some implementations may be used to detect a plurality of keywords. The keywords in these implementations may also be short phrases.

Some implementations allow a user to select one of a certain number of actions, such as actions presented in a menu, by saying one of a number of menu entries. For example, implementations may use different keywords to trigger different actions such as taking a photo, sending an email, recording a note, and so on. Given a finite number of words and/or phrases to be detected, which in some examples does not exceed about twenty, this technology may be used. However, other implementations may be adapted to handle more words and/or phrases if required.

At a high level, one embodiment comprises three modules. Module one is a front-end feature extraction module, which performs: a) speech activity detection; b) windowing of the acoustic signal; c) short-term Fourier transform; d) spectral subtraction, optionally; e) filter bank extraction; and f) log-energy transform of the filtered output. Module two is an acoustic model, which can be one of: a) a neural network; or b) a Gaussian mixture model. In module two, the input features may be converted into an output feature vector by forward-propagation through the neural network. If a Gaussian mixture model is used, the Gaussian mixture model may provide a probabilistic model for representing the presence of subpopulations within an overall population in order to code the expected acoustic events. Module three is a posterior handling module, which takes as an input the output feature vector from module two to yield a binary decision about the presence of a specific keyword or key phrase. The output feature vector may include a score that represents the probability of the presence of a key sub-word unit, a keyword, or key phrase in received audio, or the score may be computed from the output feature vector using an output classifier, which can be, for example, a support vector machine or logistic regression.

Figure 1:
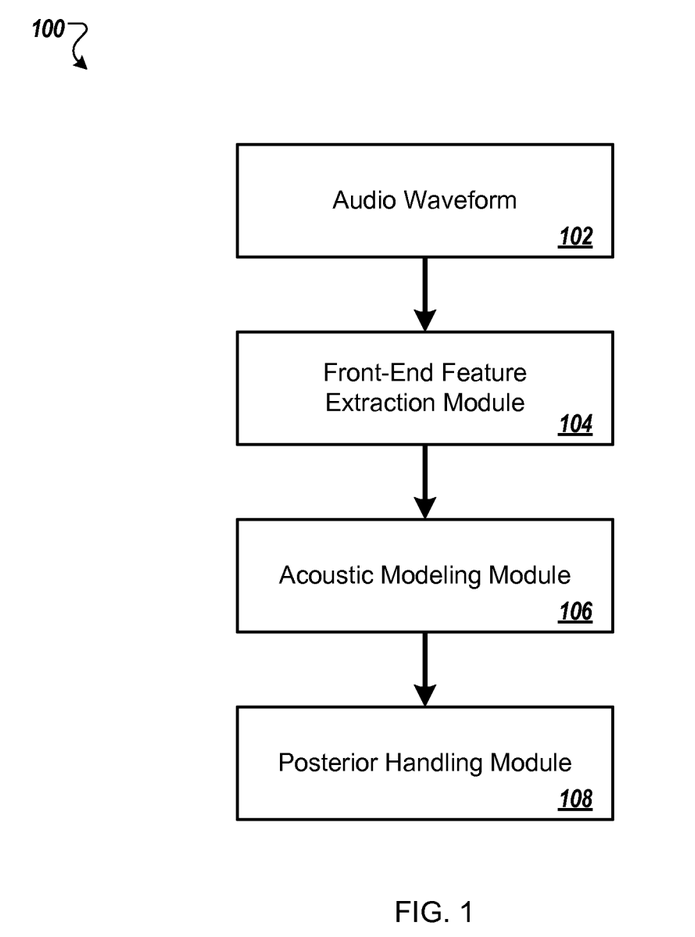
FIG. 1 is a block diagram 100 that illustrates dataflow in an embodiment.

FIG. 1 is a block diagram 100 that illustrates dataflow in an embodiment. The data flow begins with an audio waveform 102. Audio waveform 102 represents audio received by an embodiment. For example, audio waveform 102 may be an analog or digital representation of sound in the environment of an embodiment that is captured by a microphone. Once audio waveform 102 is introduced into the embodiment, the audio waveform 102 is sent to a front-end feature extraction module 104.

The front-end feature extraction module 104 performs a series of stages, described with reference to FIG. 2, that take audio waveform 102 and generates a series of audio frame vectors for further processing. Once the front-end feature extraction module 104 has finished the processing of the audio waveform 102, its output is sent to an acoustic modeling module 106.

The acoustic modeling module 106 may use a variety of techniques, described with reference to FIG. 3, to perform analysis of the data received from the front-end feature extraction module 104 to produce output feature vectors that are representative of whether or not portions of the audio waveform 102 contain specific words or sub-word units for which the acoustic modeling module is programmed.

Figure 4:
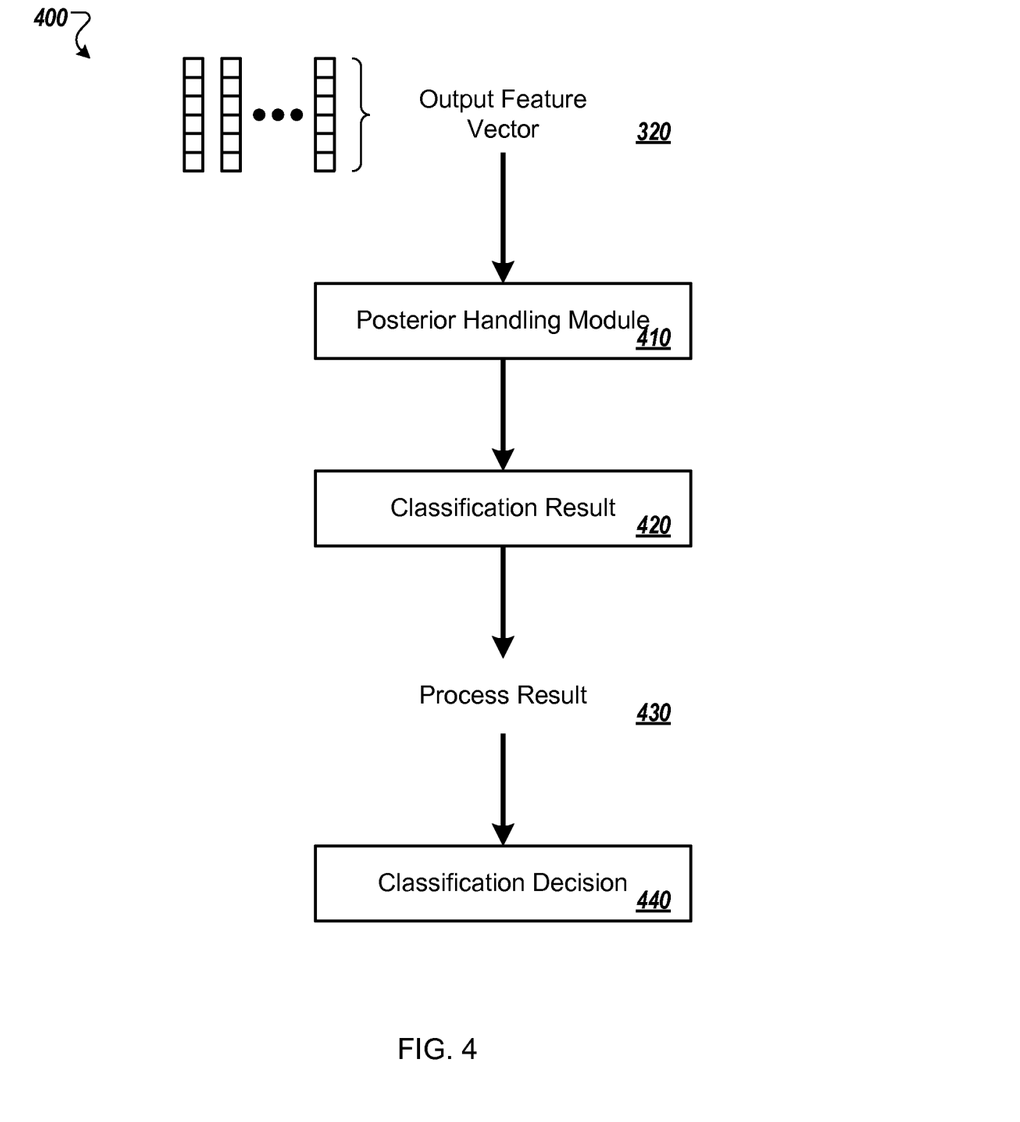
FIG. 4 is a block diagram 400 that illustrates dataflow in posterior handling process.

The acoustic modeling module 106 provides the output feature vectors to a posterior handling module 108 that uses the output feature vectors to make a determination about whether a keyword or a key phrase is present, as describe with reference to FIG. 4.

Various system embodiments are similar in their overall structure. They include modules that use similar architectures to accomplish similar goals: 1) front-end feature extraction, 2) acoustic modeling, and a 3) posterior handling.

Figure 2:
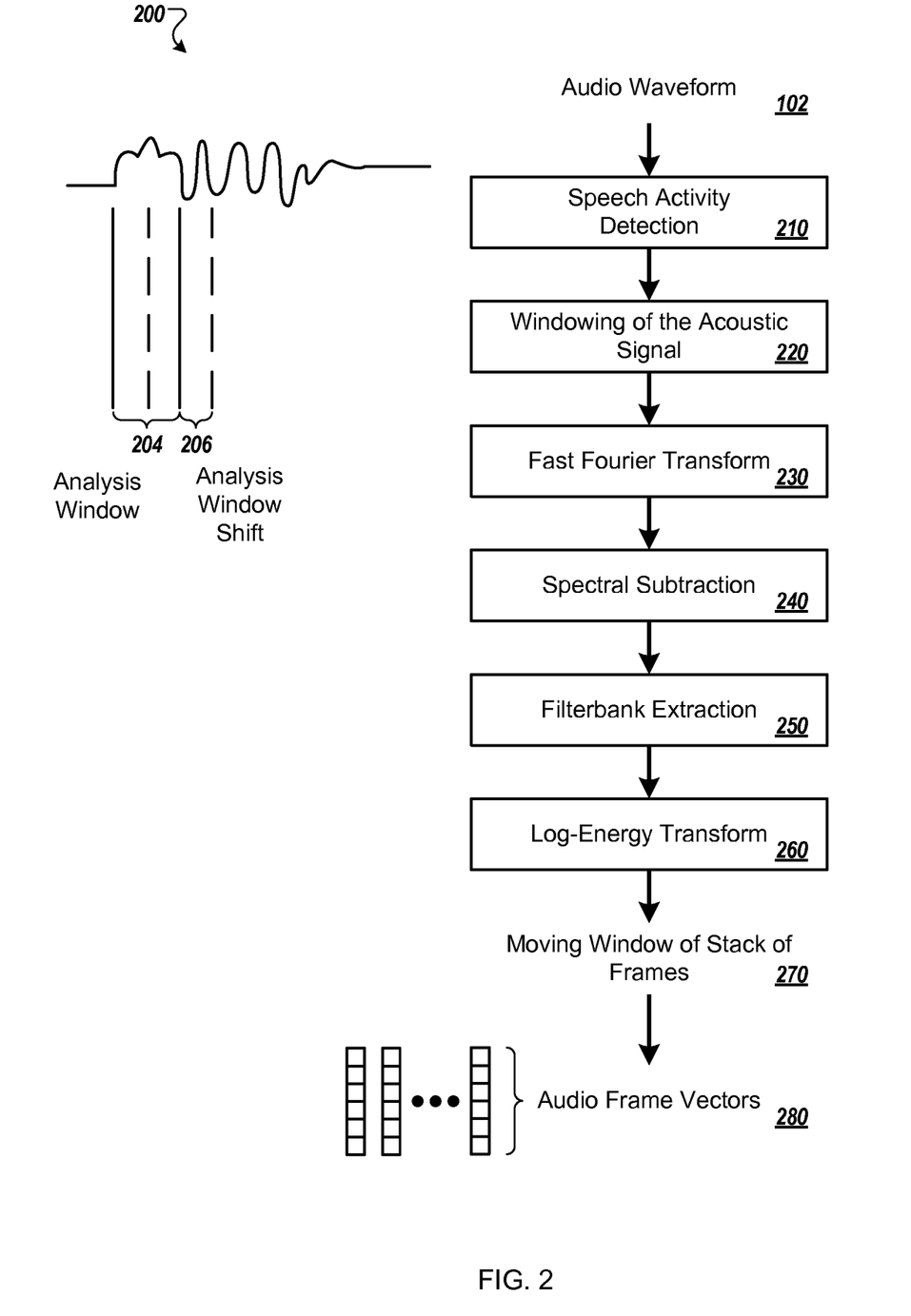
FIG. 2 is a block diagram 200 that illustrates dataflow in a front-end feature extraction process.

FIG. 2 is a block diagram 200 that illustrates dataflow in a front-end feature extraction process. For example, the front-end feature extraction module 104 may receive the audio waveform 102, as shown in FIG. 1. Audio waveform 102, as illustrated in FIG. 2, includes analog and/or digital information about incoming sound that an embodiment can analyze to detect the presence of a keyword.

One way to analyze the audio waveform 102 is by dividing the audio waveform 102 into a plurality of windows and analyzing each of the windows. For example, FIG. 2 shows an analysis window 204 that uses a vector to represent audio waveform 102 over a time period that is chosen as the size of analysis window 204, for example a 25 ms time period. Multiple analysis windows are obtained in succession by performing an analysis window shift 206, for example a 10 ms time period.

Analysis windows may be chosen to overlap. For example, one analysis window may represent audio waveform 102 from a start time of 0 ms to an end time of 25 ms, and a subsequent analysis window may represent audio waveform 102 from a start time of 10 ms to an end time of 35 ms.

The analysis windows 204 are obtained as part of speech activity detection 210, in which an embodiment obtains information about available sound in its environment. Speech activity detection 210 may be designed to occur regardless of whether there is sound in the surroundings of an embodiment, or speech activity detection 210 may, for example, occur only when a volume of sound greater than a threshold volume is received.

Once speech activity detection 210 occurs, the front-end extraction module creates a plurality of acoustic windows from the acoustic signal 220. In some implementations, each window should be a fairly short time interval, such as 25 ms, that represents characteristics of audio waveform 102 over that time interval.

After windowing, embodiments may perform a fast Fourier transform 230 on the windowed data so as to analyze the constituent frequencies present in the audio waveform.

In some implementations, the front-end feature extraction module may optionally perform spectral substitution 240 to minimize the effects of noise on the information provided by the other steps.

Filter bank extraction 250 may allow the decomposition of the information from the previous steps by using filters to separate individual components of the audio data from one another.

In some implementations, the front-end feature extraction module performs a log-energy transform 260 to normalize the data. The normalization of the data may make the data more meaningful, e.g., by enhancing relevant features in the data.

The result of the processing performed in by the system shown in FIG. 2 is a moving window of a stack of frames 270. For example, the stack of frames 270 may include eleven frames, each including information about 25 ms of audio waveform 102, with a shift of 10 ms between frames. However, it is not necessary to use a stack of eleven frames, and the stack of frames 270 may include as few as two frames or any larger number of frames, such as fifty frames. The size of the stack may depend on the length of the keyword, key phrase, or acoustic unit predicted.

The final output of front-end feature extraction is a plurality of audio frame vectors 280 that represents features of audio waveform 102 by performing the aforementioned analytical techniques to obtain information about characteristics of the audio waveform 102 for successive time intervals.

Figure 3:
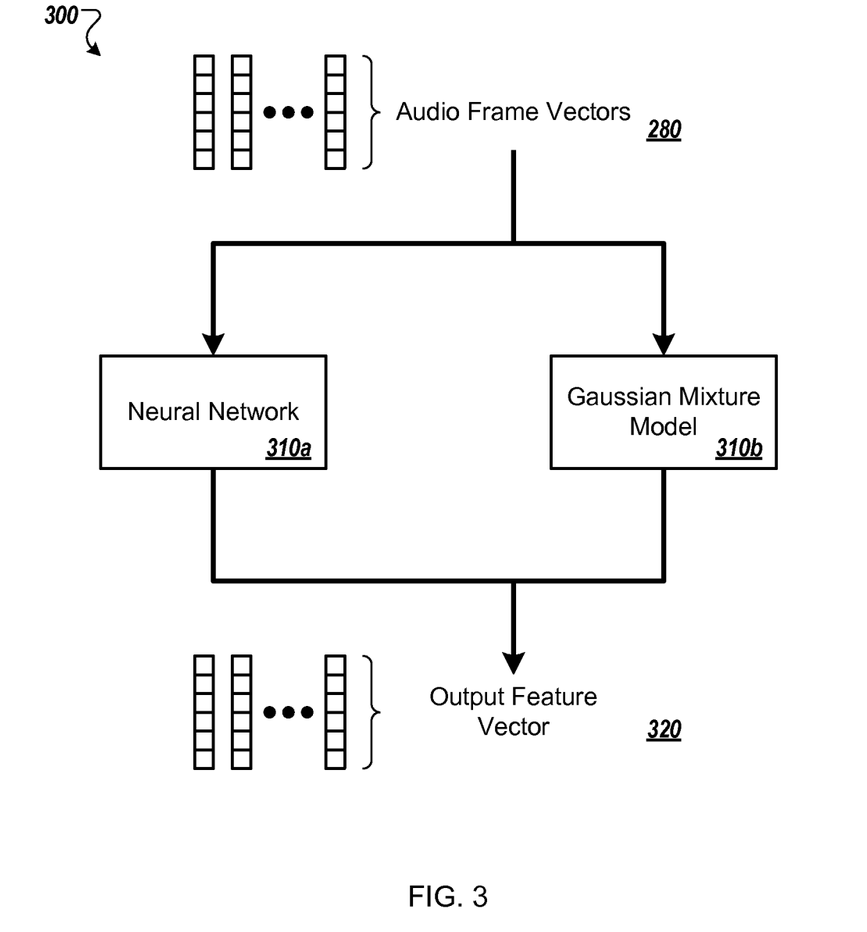
FIG. 3 is a block diagram 300 that illustrates dataflow in an acoustic modeling process.

FIG. 3 is a block diagram 300 that illustrates dataflow in an acoustic modeling process. For example, the acoustic modeling module, shown in FIG. 1, receives the plurality of audio frame vectors 280 and generates a corresponding output feature vector 320 for each of the audio frame vectors 280. A neural network 310a or a Gaussian mixture model 310b may process the plurality of audio frame vectors 280 to generate the corresponding set of output feature vectors 320, where each of the output feature vectors 320 corresponds with one of the audio frame vectors 280.

The acoustic modeling module is trained to determine whether a stack of frame vectors matches a key sub-word unit, keyword, or key phrase. For example, the neural network 310a may receive a training set of two expected event vectors for the keywords "Okay" and "Google" or four expected event vectors for the key sub-word units "oh," "kay," "g$\overline{oo}$," and "gə l".

In this example, the acoustic modeling module would process each of the audio frame vectors 280 using the neural network 310a to determine if properties of the audio frame vector match the properties of the expected event vectors for the keywords "Okay" and "Google" and generate a score for each of the expected event vectors where the score is representative of the similarity of the properties. A higher score would represent a greater similarity between an audio frame vector and an expected event vector compared to a lower score. In some examples, a lower score may represent a greater similarity between an audio frame vector and an expected event vector compared to a higher score.

When the acoustic modeling module processes a first audio frame vector and the acoustic modeling module is programmed to identify two keywords, "Okay" and "Google," a first output feature vector corresponding to the first audio frame vector includes at least two scores, one for each of the keywords. Each of the scores represents the degree of acoustic match between the first audio frame vector and the expected event vectors.

For example, when the first audio frame vector is associated with the spoken word "Okay," the scores for "Okay" and "Google" may be 1.0 and 0.0 respectively. In some examples, when the first audio frame vector is associated with the spoken word "Search," the scores for "Okay" and "Google" are both 0.0. In some examples, when the first audio frame vector is associated with the spoken word "Google," the scores for "Okay" and "Google" are 0.0 and 0.95 respectively.

In some implementations, the output feature vector 320 may include a "non-keyword" score. For example, the non-keyword score for audio frame vector associated with the spoken word "Okay" would be 0.0 and the non-keyword score for the spoken word "Search" may be 1.0 when the acoustic modeling module includes only two keywords, "Okay" and "Google." In these implementations, when the acoustic modeling module is programmed to identify two keywords, the first output feature vector includes at least three scores.

In some implementations, a sum of the scores in an output feature vector 320 is 1.0. For example, the sum of the scores for the spoken word "Okay" would be 1.0 (the "Okay" keyword score)+0.0 (the "Google" keyword score)+0.0 (the non-keyword score)=1.0 and the sum of the scores for the spoken word "Google" may be 0.0 (the "Okay" keyword score)+0.95 (the "Google" keyword score)+0.05 (the non-keyword score) =1.0.

The scores may represent the confidence of the acoustic modeling module that the acoustic properties of an audio frame vector match an expected event vector. In some examples, when the acoustic modeling module identifies a match between an audio frame vector and an expected event vector, the corresponding score might not be 1.0 based on a variance between the audio frame vector and the expected event vector, such as with the example for the spoken word "Google" above.

In some implementations, an expected event vector may be associated with a sub-word unit such as a phoneme, a syllable, one or more letters, one or more numerals, a word, or a base pair to name a few examples. Different expected event vectors may represent different types of sub-word units or different combinations of sub-word units.

In some implementations, an expected event vector may represent a key phrase. For example, a first expected event vector may correspond with the key phrase "Okay Google" and a second expected event vector may correspond with the keyword "Google." In this example, when the acoustic modeling module receives an audio frame vector for the spoken phrase "Okay Google," the score for the key phrase "Okay Google" may be 0.7 and the score for the key phrase "Google" may be 0.3.

In some implementations, the acoustic modeling module scores a key phrase based on the order of the words or sub-word units in the key phrase. For example, when a key phrase includes the sub-word units "oh," "kay," "g$\overline{oo}$," and "gə l," the acoustic modeling module determines whether a continuous sequence of four audio frame vectors acoustically match the expected event vectors for the sub-word units "oh," "kay," "g$\overline{oo}$," and "gə l," and assigns a score to the sequence of audio frame vectors accordingly. The acoustic modeling module may generate an output feature vector for each set of four continuous audio frame vectors where the output feature vector includes scores that represent the similarity of the audio frame vectors to the key phrase and any other keywords or key phrases which the acoustic modeling module is trained to identify. If the acoustic modeling module identifies four audio frame vectors that are similar to the sub-word units "oh," "kay," "g$\overline{oo}$," and "gə l" but in a different order, the corresponding score in an output feature vector is low, e.g., 0.0.

In some implementations, the acoustic modeling module may be trained to identify words or sub-word units spoken by a particular user. For example, the acoustic modeling module may be trained to identify particular sub-word units associated with specific keywords or key phrases and the pronunciation of the particular user such that when a different user speaks the specific keywords or key phrases, the acoustic modeling module generates low keyword similarity scores for the sub-word units spoken by the different user, e.g., 0.0.

In these implementations, the training data for the acoustic modeling module may include data representing the specific keywords spoken by the particular user and data representing the specific keywords spoken by different users.

FIG. 4 is a block diagram 400 that illustrates dataflow in a posterior handling process. For example, a posterior handling module 410 receives the output feature vector 320 that has been produced by the system described in FIG. 3. In some examples, the posterior handling module 410 may use support vector machine or logistic regression to make a binary decision about whether a keyword was uttered during a time window of the audio waveform 102 that is associated with the output feature vector 320.

Posterior handling module 410 produces classification result 420. This may be an actual classification decision 440, in terms of a Boolean decision confirming that a keyword or a key phrase was present in the audio waveform 102 or not.

In some implementations, the classification result 420 may be a score. For example the score may represent the likelihood that a keyword or a key phrase is present. If classification result 420 is a score, there may be a step to process the result 430 to yield classification decision 440, for example comparing the score to a threshold value.

In some implementations, the posterior handling module 410 combines corresponding scores from multiple output feature vectors 320 to determine whether a keyword was uttered during a time window of the audio waveform 102. For example, the posterior handling module 410 may average twenty scores associated with the keyword "Google" from twenty consecutive output feature vectors and use the average to determine whether "Google" was spoken during a time period that corresponds with the twenty consecutive output feature vectors. In this example, the posterior handling module 410 would also average the scores for the other keywords or key phrases represented in the output feature vectors, such as the "Okay" keyword scores and the non-keyword scores.

The posterior handling module 410 may use any appropriate window for the consecutive scores. For example, the posterior handling module 410 may average the corresponding scores from eleven consecutive output feature vectors.

The posterior handling module 410 then uses the combination of the scores to determine whether the keyword was spoken during the time window of the audio waveform 102. For example, the posterior handling module 410 determines whether the combination is greater than a predetermined threshold value and, if so, determines that the keyword or key phrase associated with the score was likely spoken during the time window of the audio waveform 102.

In some implementations, the posterior handling module 410 combines corresponding scores from multiple output feature vectors 320 by determining a geometric mean, a sum, or a product of the scores.

In some implementations, the posterior handling module 410 determines a maximum value of the scores corresponding to a particular keyword or key phrase as the combination of the scores. For example, the posterior handling module 410 may determine a maximum score value from one-hundred consecutive output feature vectors 320 and use the maximum value when determining whether the audio waveform 102 includes the keyword or key phrase. In some examples, when the maximum value is greater than a predetermined threshold, the posterior handling module 410 determines that the keyword or key phrase was included in the audio waveform 102.

The posterior handling module 410 may move a window and/or may use windows of different sizes when determining whether a keyword or key phrase was spoken during a different portion of the audio waveform 102. For example, the posterior handling module 410 may look at different overlapping or non-overlapping windows and determine a combination of the scores for the different window.

In some implementations, the posterior handling module 410 enforces the order of words or sub-word units associated with keywords or key phrases. For example, when the acoustic modeling module generates scores for sub-word units that are portions of keywords or key phrases, the posterior handling module 410 determines whether the portions of the keywords or key phrases occurred in the correct order when determining whether the keyword or key phrase was recorded in the audio waveform 102.

For example, when the key phrase is "Okay Google" and the posterior handling module 410 receives a first output feature vector with a score of 1.0 for "Okay" and a second output feature vector with a score of 1.0 for "Google," where the first output feature vector corresponds with a portion of the audio waveform immediately prior to the portion of the audio waveform that corresponds with the second output feature vector without any intermediate portions, the posterior handling module 410 determines that the key phrase "Okay Google" was recorded in the audio waveform 102. The posterior handling module 410 may perform a similar process for portions of keywords, such as "goo" and "gle" or "$\overline{goo}$" and "gə l".

In some examples, when the posterior handling module 410 determines that a first output feature vector has a score of 1.0 for "Google" and a second output feature vector has a score of 1.0 for "Okay," where the second output feature vector corresponds with a later portion of the audio waveform 102 than the first output feature vector and/or at least one feature vector corresponds with a portion of the audio waveform 102 between the portions of the audio waveform that correspond with the first and second output feature vectors. In these examples, the posterior handling module 410 determines that the key phrase "Okay Google" was not recorded in those portions of the audio waveform 102.

Figure 5:
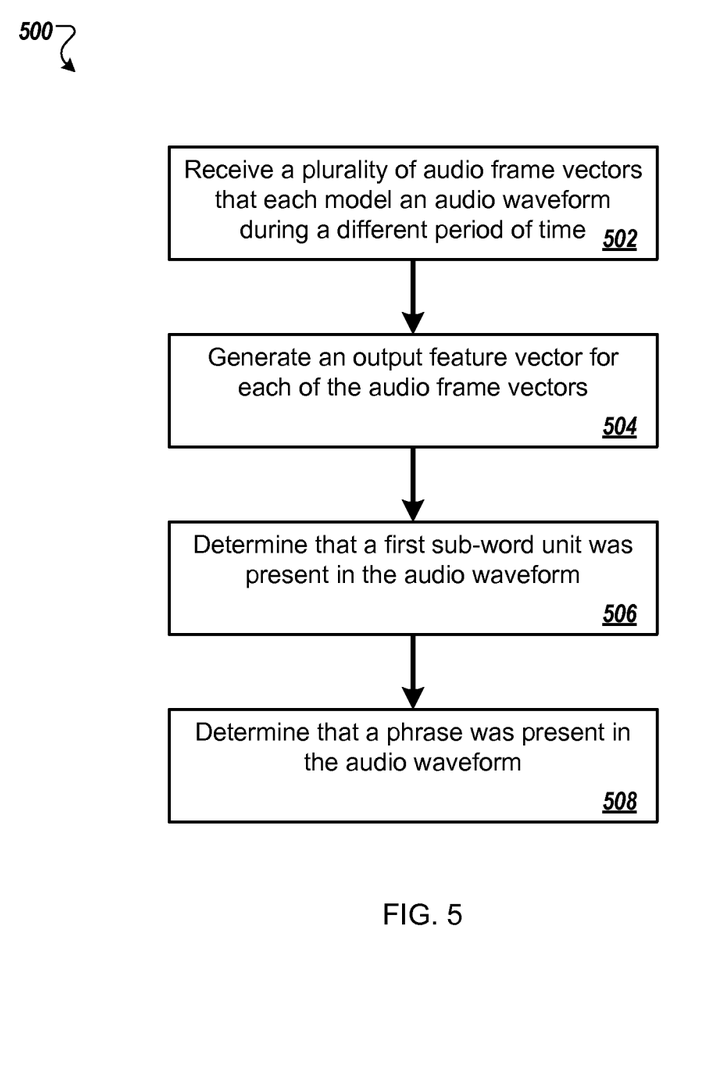
FIG. 5 is a flowchart 500 of the stages involved in an example process for detecting keyword utterances in an audio waveform.

FIG. 5 is a flowchart of the stages involved in an example process 500 for detecting keyword utterances in an audio waveform.

The process receives audio frame vectors (502). For example, step 502 may be performed as described with reference to FIG. 2, such that the front-end feature extraction module 104 processes the audio waveform 102 to yield the audio frame vectors 280.

The process generates an output feature vector for each of the audio frame vectors (504). Each output feature vector includes a set of scores that characterize an acoustic match between the corresponding audio frame vector and a set of expected event vectors where each of the expected event vectors corresponds to one of the scores and defines acoustic properties of at least a portion of a keyword. In some implementations, a sum of the set of scores for the output feature vector is one.

The process determines that a first sub-word unit was present in the audio waveform (506). For example, the posterior handling module determines that the first sub-word unit was present in the audio waveform during an overall period of time modeled by the audio frame vectors by combining corresponding scores from the output feature vectors that where each of the corresponding scores characterizes the acoustic match between the audio frame vector and the same expected event vector from the set of expected event vectors. Each of the output feature vectors corresponds to one of the audio frame vectors. The first sub-word unit corresponds to at least a portion of one of the keywords, a corresponding one of the expected event vectors, and a corresponding one of the scores in the output feature vector. For example, the first sub-word unit may correspond with a word or a portion of a word.

In some implementations, the posterior handling module combines the scores by averaging, by determining a geometric mean, by determining a sum, a product, or a maximum score for each of the corresponding scores from the output feature vectors.

The process determines that a phrase was present in the audio waveform (508). For example, the posterior handling module determines that a predetermined phrase was present in the audio waveform during the overall period of time modeled by the audio frame vectors. The predetermined phrase includes the first sub-word unit and a second sub-word unit that corresponds to at least a portion of one of the keywords and a corresponding one of the expected event vectors. For example, the second sub-word unit may correspond with a word or a portion of a word different than the first sub-word unit.

The predetermined phrase represents a key phrase for which the acoustic modeling module is programmed to identify. For example, the first and the second sub-word units might not be keywords or portions of keywords alone but combine to form a keyword or a key phrase that is of importance for the posterior handling module when the first and second sub-word units are identified in sequence.

For example, when the posterior handling module determines that the second sub-word unit occurred in the audio waveform immediately prior to the first sub-word unit, the posterior handling module determines that the audio waveform does not include any keywords or key phrases, assuming no other specific sub-word units were identified for which the acoustic modeling module was programmed.

When the posterior handling module identifies the first sub-word unit immediately prior to the second sub-word unit, without any intervening sub-word units and based on the output features vectors, the posterior handling module determines that the audio waveform includes a keyword or a key phrase and provides data associated with the keyword or key phrase to another module in a system, e.g., that performs an action based on the keyword or the key phrase.

In some implementations, the process 500 can include additional steps, fewer steps, or some of the steps can be divided into multiple steps. For example, the acoustic modeling module may perform steps 502 through 506 without performing step 508.

In some implementations, the acoustic modeling module uses a neural network, e.g., a deep neural network, to generate the output feature vector. For example, the neural network may be trained, prior to the generation of the output feature vector, with a set of training audio frame vectors that includes the expected event vectors. In some examples, each of the set of training audio frame vectors includes properties of spoken sub-word units associated with keywords or key phrases. The training audio frame vectors includes the properties of the expected event vectors such that training with the expected event vectors teaches the neural network the combination of properties to identify that correspond with each of the expected event vectors and the sub-word units of the keywords and key phrases.

In some implementations, the set of training audio frame vectors comprises a plurality of general audio frame vectors where each of the general audio frame vectors is different from all of the expected event vectors and corresponds with words different from the keywords. For example, the general audio frame vectors include properties of sub-word units not included in any of the keywords or key phrases the acoustic modeling module identifies, e.g., general speech that does not include the keywords or key phrases. The neural network may use the general audio frame vectors to identify combinations of properties that are not associated with any of the expected event vectors.

In some implementations, the acoustic modeling module uses a Gaussian mixture model to generate the output feature vector.

Figure 6:
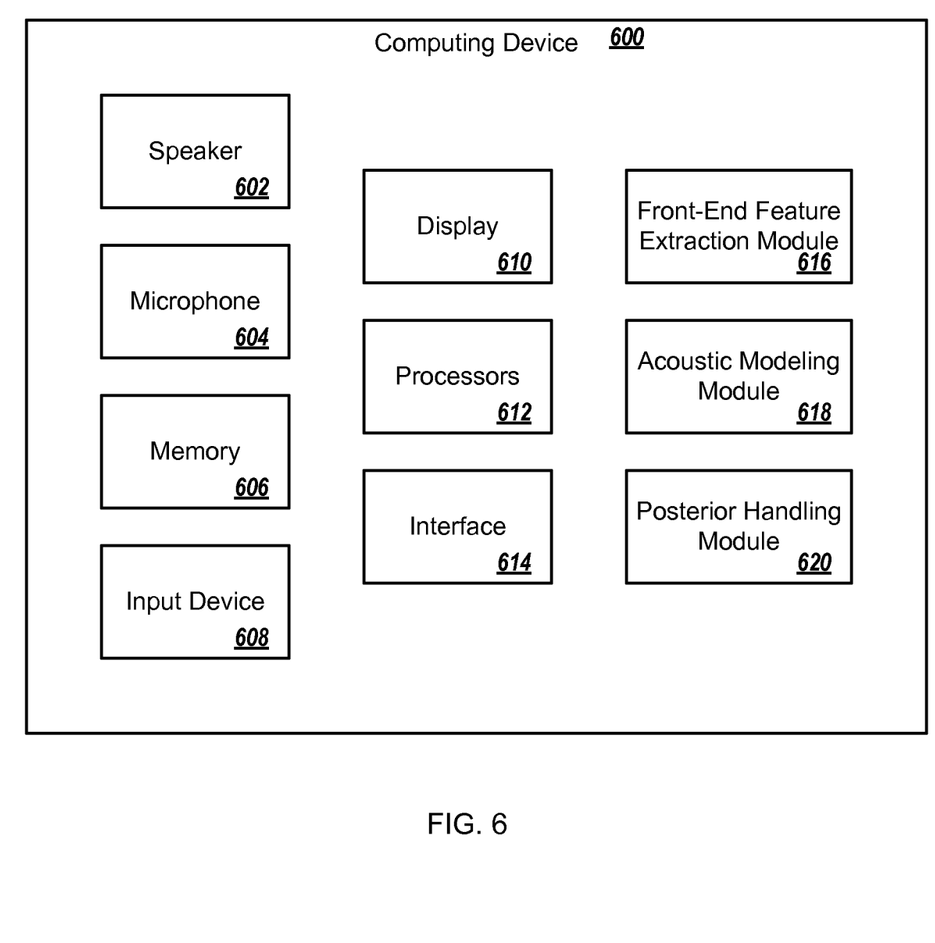
FIG. 6 is a block diagram 600 of an example system that can detect keyword utterances in an audio waveform.

FIG. 6 is a block diagram 600 of an example system that can detect keyword utterances in an audio waveform. The system contains a variety of constituent parts and modules that may be implemented through appropriate combinations of hardware, firmware, and software that allow computing device 600 to function as an embodiment of appropriate features.

Computing device 600 contains one or more processors 612 that may include various hardware devices designed to process data. Processors 612 are communicatively coupled to other parts of computing device 600. For example, processors 612 may be coupled to a speaker 602 and a microphone 604 that allow output and input of audio signals to and from the surroundings of computing device 600. Microphone 604 is of special import to the functioning of computing device 600 in that microphone 604 provides the raw signals that capture aspects of audio waveform 102 that are processed in other portions of computing device 600.

The computing device 600 may include memory 606. The memory may include a variety of memory storage devices, such as persistent storage devices that allow permanent retention and storage of information manipulated by processors 612.

An input device 608 allows the receipt of commands from a user, and interface 614 allows computing device 600 to interact with other devices to allow information exchange. Additionally, processors 612 may be communicatively coupled to a display 610 that provides a graphical representation of information processed by computing device 600 for the user to view.

The processors 612 may be communicatively coupled to a series of modules that perform the functionalities necessary to implement the method of embodiments that is presented in FIG. 5. These modules include front-end feature extraction module 616, which performs as described with reference to FIG. 2, acoustic modeling module 618, which performs as described with reference to FIG. 3, and posterior handling module 620, which performs as described with reference to FIG. 4.

As discussed above, the task of hotword or keyword detection is an important component in some speech recognition applications. For example, when the vocabulary size is limited, or when the task requires activating a device, for example, a phone, by saying a word, keyword detection is applied to classify whether an utterance contains a word or not and whether the word is a particular word or part of a phrase for which the device has been programmed to identify.

For example, the task performed by some embodiments includes detecting a single word, for example, "Google," that will activate a device in standby to perform a task. This device should be listening all the time for such word. A common problem in portable devices is battery life, and limited computation capabilities. Because of this, it is important to design a keyword detection system that is both accurate and computationally efficient.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A computer-implemented method comprising:
receiving, by a keyword detection system that is trained to determine whether any of multiple keywords are included in an utterance by comparing audio frame vectors of the utterance with expected event vectors for each of the keywords, a plurality of audio frame vectors that each model an audio waveform during a different period of time;
generating an output feature vector for each of the audio frame vectors, wherein each output feature vector includes a set of scores that characterize an acoustic match between the corresponding audio frame vector and a set of expected event vectors and a sum of each of the scores in the set of scores for the output feature vector is one, each of the expected event vectors corresponding to one of the scores and defining acoustic properties of at least a portion of a keyword included in the multiple keywords; and
providing each of the output feature vectors to a posterior handling module.

2. The method of claim 1, further comprising:
determining, using the posterior handling module, that a first sub-word unit was present in the audio waveform during an overall period of time modeled by the audio frame vectors by combining corresponding scores from the output feature vectors, each of the corresponding scores characterizing the acoustic match between the audio frame vector and the same expected event vector from the set of expected event vectors, each of the output feature vectors corresponding to one of the audio frame vectors, the first sub-word unit corresponding to at least a portion of the keyword, a corresponding one of the expected event vectors, and a corresponding one of the scores in the output feature vector.

3. The method of claim 2, wherein the combining comprises determining a geometric mean for each of the corresponding scores in the output feature vectors.

4. The method of claim 2, further comprising:
determining, using the posterior handling module, that a predetermined phrase was present in the audio waveform during the overall period of time modeled by the audio frame vectors, the phrase comprising the first sub-word unit and a second sub-word unit, the second sub-word unit corresponding to at least a portion of one of the multiple keywords and a corresponding one of the expected event vectors.

5. The method of claim 1, wherein:
the output feature vector is generated using a neural network;
the method further comprising training, prior to generating the output feature vector, the neural network with a set of training audio frame vectors that comprises the expected event vectors.

6. The method of claim 5, wherein the set of training audio frame vectors comprises a plurality of general audio frame vectors, each of the general audio frame vectors different from all of the expected event vectors and corresponding to words different from each of the multiple keywords.

7. The method of claim 1, wherein the output feature vector is generated using a Gaussian mixture model.

8. A keyword detection system that is trained to determine whether any of multiple keywords are included in an utterance by comparing audio frame vectors of the utterance with expected event vectors for each of the keywords comprising:
one or more computers and one or more storage devices storing instructions that are operable, when executed by the one or more computers, to cause the one or more computers to perform operations comprising:
receiving, by the keyword detection system, a plurality of audio frame vectors that each model an audio waveform during a different period of time;
generating an output feature vector for each of the audio frame vectors, wherein each output feature vector includes a set of scores that characterize an acoustic match between the corresponding audio frame vector and a set of expected event vectors, the set of scores includes only one score for each keyword for which the keyword detection system is trained and a non-keyword score, each of the expected event vectors corresponding to one of the scores and defining acoustic properties of at least a portion of a keyword included in the multiple keywords; and
providing each of the output feature vectors to a posterior handling module.

9. The system of claim 8, wherein a sum of the set of scores for the output feature vector is one.

10. The system of claim 8, the operations further comprising:
determining, using the posterior handling module, that a first sub-word unit was present in the audio waveform during an overall period of time modeled by the audio frame vectors by combining corresponding scores from the output feature vectors that, each of the corresponding scores characterizing the acoustic match between the audio frame vector and the same expected event vector from the set of expected event vectors, each of the output feature vectors corresponding to one of the audio frame vectors, the first sub-word unit corresponding to at least a portion of one of the keywords, a corresponding one of the expected event vectors, and a corresponding one of the scores in the output feature vector.

11. The system of claim 10, the operations further comprising:
determining, using the posterior handling module, that a predetermined phrase was present in the audio waveform during the overall period of time modeled by the audio frame vectors, the phrase comprising the first sub-word unit and a second sub-word unit, the second sub-word unit corresponding to at least a portion of one of the keywords and a corresponding one of the expected event vectors.

12. The system of claim 8, wherein:
the output feature vector is generated using a neural network;
the operations further comprising training, prior to generating the output feature vector, the neural network with a set of training audio frame vectors that comprises the expected event vectors.

13. The system of claim 12, wherein the set of training audio frame vectors comprises a plurality of general audio frame vectors, each of the general audio frame vectors different from all of the expected event vectors and corresponding to words different from each of the multiple keywords.

14. A non-transitory computer-readable medium storing software comprising instructions executable by one or more computers which, upon such execution, cause the one or more computers to perform operations comprising:
receiving, by a keyword detection system that is trained to determine whether any of multiple keywords are included in an utterance by comparing audio frame vectors of the utterance with expected event vectors for each of the keywords, a plurality of audio frame vectors that each model an audio waveform during a different period of time;

generating an output feature vector for each of the audio frame vectors, wherein each output feature vector includes a set of scores that characterize an acoustic match between the corresponding audio frame vector and a set of expected event vectors and a sum of each of the scores in the set of scores for the output feature vector is one, each of the expected event vectors corresponding to one of the scores and defining acoustic properties of at least a portion of a keyword included in the multiple keywords; and providing each of the output feature vectors to a posterior handling module.

15. The computer-readable medium of claim 14, the operations further comprising:

determining, using the posterior handling module, that a first sub-word unit was present in the audio waveform during an overall period of time modeled by the audio frame vectors by combining corresponding scores from the output feature vectors that, each of the corresponding scores characterizing the acoustic match between the audio frame vector and the same expected event vector from the set of expected event vectors, each of the output feature vectors corresponding to one of the audio frame vectors, the first sub-word unit corresponding to at least a portion of one of the keywords, a corresponding one of the expected event vectors, and a corresponding one of the scores in the output feature vector.

16. The computer-readable medium of claim 15, the operations further comprising:

determining, using the posterior handling module, that a predetermined phrase was present in the audio waveform during the overall period of time modeled by the audio frame vectors, the phrase comprising the first sub-word unit and a second sub-word unit, the second sub-word unit corresponding to at least a portion of one of the keywords and a corresponding one of the expected event vectors.

17. The computer-readable medium of claim 14, wherein:

the output feature vector is generated using a neural network;

the operations further comprising training, prior to generating the output feature vector, the neural network with a set of training audio frame vectors that comprises the expected event vectors.

18. The computer-readable medium of claim 17, wherein the set of training audio frame vectors comprises a plurality of general audio frame vectors, each of the general audio frame vectors different from all of the expected event vectors and corresponding to words different from each of the multiple keywords.

19. The method of claim 1, wherein the set of scores includes only one score for each keyword for which the keyword detection system is trained and a non-keyword score.

20. The method of claim 4, comprising:

determining that a first audio frame vector for the first sub-word unit represents a first portion of the audio waveform immediately prior to a second portion of the audio waveform represented by a second audio frame vector for the second sub-word unit, wherein determining, using the posterior handling module, that the predetermined phrase was present in the audio waveform during the overall period of time modeled by the audio frame vectors comprises determining that the predetermined phrase was present in the audio waveform during the overall period of time modeled by the audio frame vectors in response to determining that the first audio frame vector for the first sub-word unit represents the first portion of the audio waveform immediately prior to the second portion of the audio waveform represented by the second audio frame vector for the second sub-word unit.

21. The method of claim 2, wherein determining, using the posterior handling module, that a first sub-word unit was present in the audio waveform during an overall period of time modeled by the audio frame vectors by combining corresponding scores from the output feature vectors comprises making a Boolean decision that the first sub-word unit was present in the audio waveform.

22. The method of claim 1, comprising:

generating an output feature vector for a sequence of audio frame vectors using an order of sub-word units represented by the audio frame vectors.

23. The method of claim 1, wherein the set of scores includes one score for each keyword for which the keyword detection system is trained.

24. The system of claim 11, comprising:

determining that a first audio frame vector for the first sub-word unit represents a first portion of the audio waveform immediately prior to a second portion of the audio waveform represented by a second audio frame vector for the second sub-word unit, wherein determining, using the posterior handling module, that the predetermined phrase was present in the audio waveform during the overall period of time modeled by the audio frame vectors comprises determining that the predetermined phrase was present in the audio waveform during the overall period of time modeled by the audio frame vectors in response to determining that the first audio frame vector for the first sub-word unit represents the first portion of the audio waveform immediately prior to the second portion of the audio waveform represented by the second audio frame vector for the second sub-word unit.

25. The system of claim 11, wherein determining, using the posterior handling module, that a first sub-word unit was present in the audio waveform during an overall period of time modeled by the audio frame vectors by combining corresponding scores from the output feature vectors comprises making a Boolean decision that the first sub-word unit was present in the audio waveform.

26. The system of claim 8, comprising:

generating an output feature vector for a sequence of audio frame vectors using an order of sub-word units represented by the audio frame vectors.

27. The system of claim 8, wherein the set of scores includes one score for each keyword for which the keyword detection system is trained.

* * * * *